Figure 1:
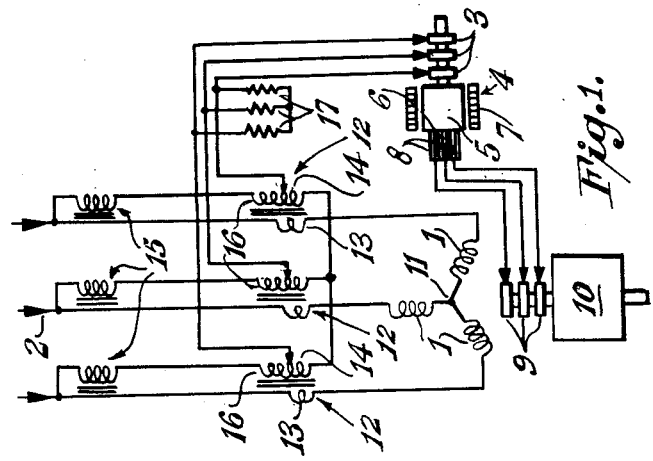

United States Patent Office 3,069,607
Patented Dec. 18, 1962

3,069,607
POLYPHASE SLIPRING ELECTRIC MOTORS AND CONTROL MEANS THEREFOR
Nicolas Worthing, London, England, assignor, by mesne assignments, to The Harland Engineering Company Limited, Alloa, Scotland, a corporation of the United Kingdom
Filed Apr. 20, 1959, Ser. No. 807,583
Claims priority, application Great Britain Apr. 23, 1958
14 Claims. (Cl. 318—61)

This invention relates to polyphase, position control servo-means whereby a polyphase, slipring electric motor is forced to run in unison with an independently driven, torqueless frequency converter, when the combination is fed from a polyphase A.C. supply. The combination forms a rigidly interlock, position control servo-system with large amplification in power because the input power required to drive the frequency converter is confined to small frictional and windage losses. Interlock is maintained at any speed above or below, but preferably near, the natural synchronous speed of the motor corresponding to the frequency of the polyphase A.C. supply.

It has been proposed to connect an independently driven frequency converter in series with the stator windings and rotor windings of an electric motor, whereby said motor is forced to run in unison with the frequency converter when the combination is fed from a polyphase A.C. supply. In one construction, the stator current of the motor is passed through a primary winding of a transformer, a secondary winding of which forces a current into the rotor via the frequency converter. Such an arrangement has certain disadvantages and limitations which will become apparent from the following description.

An object of the present invention is to provide an improved control means for a polyphase slipring motor.

According to the present invention, a position control servo-system includes a polyphase slipring electric motor having stator windings and rotor windings, an independently driven torqueless frequency converter, said stator windings, frequency converter and rotor windings being connected with a polyphase A.C. supply, drive means for said frequency converter and a choke adapted to draw an additional current from said polyphase A.C. supply and inject said current, through said frequency converter, into said rotor windings. The stator windings may be closed to a star point and may be connected to a polyphase A.C. supply. With this arrangement a transformer is employed to supply the rotor windings with a current through the frequency converter. The stator current is passed through a primary winding of the transformer, and a secondary winding thereof is connected in series with the frequency converter and the rotor windings.

The motor is of standard, polyphase, slipring motor construction and the frequency converter may also be of known construction, for example, it may consist of an armature, with commutator and sliprings rotating in a laminated iron stator which has no windings, but merely serves to provide the return magnetic path for the flux generated by currents in the armature. In an alternative construction of frequency converter, an iron ring is shrunk onto the armature after it has been wound and replaces the stator of the foregoing construction.

The stator windings for the motor may be adapted to be connected to an auxiliary, polyphase, variable frequency generator and the frequency converter may be adapted to be short circuited on its input side, whereby the motor may be started and run-up as an induction motor. With this arrangement, means are provided to compare the frequency of the current supplied by the auxiliary generator with the frequency of the current on the input side of the frequency converter, which latter current is induced in the rotor, said means being adapted to cut off the supply from the auxiliary generator, switch in the main supply of electric current and unshort the input side of the converter when the motor is in step with said frequency converter.

Two, or more, position control servo-systems according to the present invention may be connected to a common polyphase A.C. supply, in which case, the frequency converter of each system is coupled to a common drive means. If desired, each frequency converter may be coupled to the drive means through a variable gear mechanism.

Figure 2:
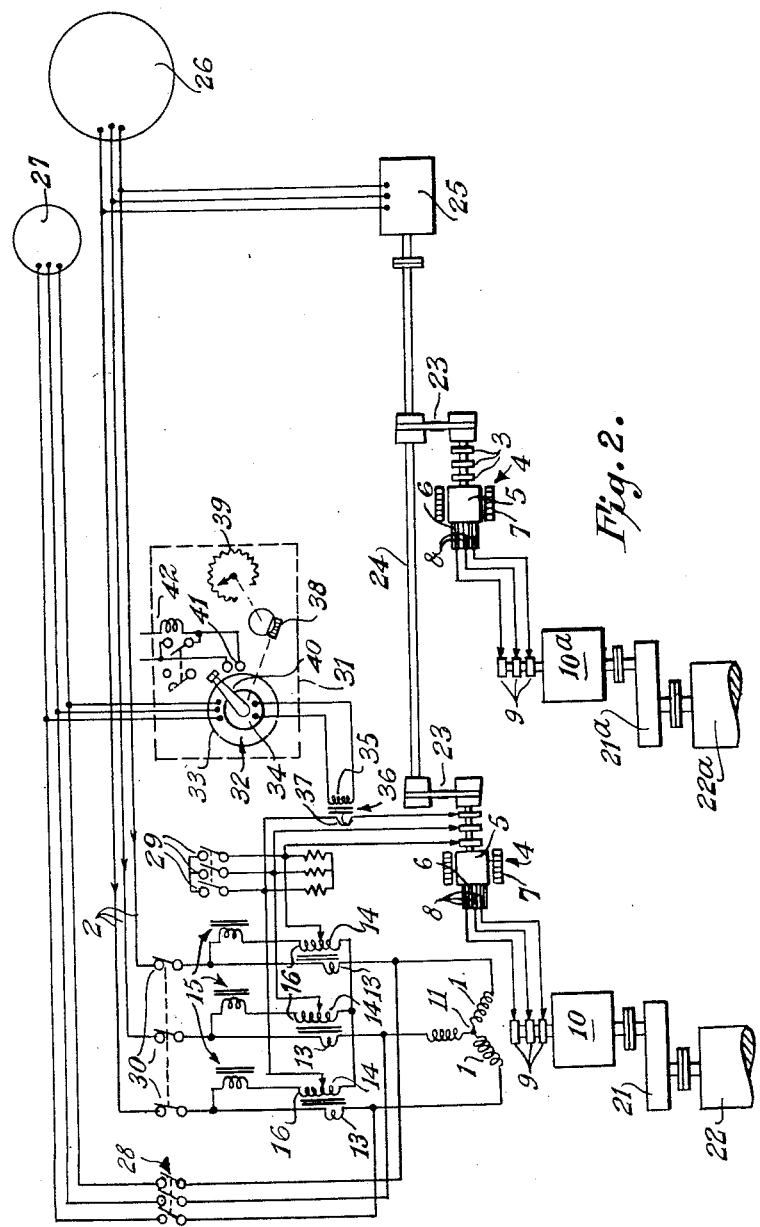

The invention is illustrated by way of example in the accompanying drawings in which:

FIGURE 1 shows a circuit diagram of a simple form of position control servo-system according to the invention; and FIGURE 2 shows a circuit diagram of two servo-systems, according to the present invention, connected to a polyphase A.C. supply.

Throughout the following description like reference numerals are used to indicate like parts.

Referring to FIGURE 1 the stator windings 1 of a polyphase slipring motor are connected to a polyphase A.C. supply 2. The inner ends of each phase winding of the stator are closed to a star point 11 and the current for a frequency converter 4 is taken by a polyphase transformer 12 from the current of the stator windings 1. The frequency converter 4 is of the type hereinbefore referred to and consists of a wound armature 5, with a commutator 6 and sliprings 3 rotating in a laminated iron stator 7. The converter output is connected to the rotor 10 of the motor through polyphase brushes 8 on the commutator 6 of the frequency converter 4 and sliprings 9 of the motor. The frequency converter 4 is independently driven and the frequency of the current at the commutator brushes 8, namely the frequency of the current supply to the rotor windings of the motor, is the difference between the frequency of the current supply to the converter by the A.C. supply through the stator windings 1 and the converter speed. The converter, therefore, is turned at a predetermined speed dependent upon the speed at which the motor is required to run. At this frequency, the rotor current can remain in opposition to the stator current only if the speed of rotation of the rotor is equal to that of the converter. Any deviation in relative positions causes a strong restoring torque to be developed in the motor. It follows, therefore, that once the converter and rotor have been synchronised, by means which will be described later, the motor will continue to follow the converter. The power required to drive the converter is small and is independent of the load on the motor. The power factor of the motor is near unity over a wide range of load. At high loads a leading power factor can be obtained if the motor is designed with a locked rotor E.M.F. slightly in excess of the stator back E.M.F.

A primary winding 13 of the transformer 12 is connected in series with the stator windings 1, and a secondary winding 14 of each transformer is connected to the sliprings 3 of the frequency converter 4. With this arrangement, it will be appreciated that the power factor can readily be adjusted by altering the transformer ratio.

The torque/position-error characteristic of motors wired up as previously known is steep at high values of load, but rather flat at low loads. This characteristic can be improved by injecting an additional current to the sliprings 3 of the frequency converter 4 and hence to the rotor 10 of the motor, by means of a polyphase choke 15. This choke 15 draws an approximately constant value of current from the supply to the stator windings 1 and passes it to tertiary windings 16 of the transformer 12. This causes an additional excitation current to be injected, via the frequency converter 4 into the rotor 10. The result is that the stator takes a leading current which neutralises the lagging current drawn by the choke 15 and makes the power factor of the whole system approximately unity at all loads. Furthermore, the slope of the torque/position-error characteristic becomes more uniform over the working range of the motor. Resistors 17 are connected across the sliprings 3 of the frequency converter 4 and serve to damp out any phase swinging which could occur as a result of a sudden change of load on the motor.

An application of the polyphase position control servo-system according to the present invention, is for driving the sections of a paper-making machine or other multi-section machines in which the speed relationship between the various sections has to be infinitely adjustable and then maintained with great accuracy. An arrangement of two motors is shown in FIGURE 2. Each motor is coupled through gearing 21, 21a respectively with the sections 22 and 22a of a paper making machine. In FIGURE 4 the circuit diagram for only one motor is shown, but it is to be understood that the circuit of the other motor or motors, if there are more than two, is identical with that of the first motor. The stator and rotor windings of the motor are connected up as hereinbefore described and shown in FIGURE 3. Each frequency converter 4 is coupled through an infinitely variable ratio transmission mechanism 23 with a master drive shaft 24 rotated by an electric motor 25 from a main generator 26 producing the polyphase A.C. supply 2. With this arrangement, the frequency converter 4 of each motor can be run at a predetermined speed depending upon the speed required for each motor. With this arrangement, the overall speed of the paper-making machine may be controlled simply by varying the frequency and voltage of the main supply 2 without affecting the predetermined speed relationship between the various motors driving the sections of the paper-making machine.

Each motor is started independently and run-up as an induction motor until its speed is substantially that at which it is required to operate, whereupon the motor is caused to run as a slipring motor under the control of the frequency converter connected to its rotor. To facilitate start-up, each motor is connected to an auxiliary polyphase generator 27 arranged to supply current at a low frequency and voltage, but variable so that as the motor picks up speed, the frequency and voltage can be increased thereby causing the motor to accelerate. The current from the auxiliary generator 27 is fed direct to the stator windings 1 through the switches 28. When the motor is being run as an induction motor the current induced in its rotor is short circuited by switches 29 connected across the sliprings 3 of the frequency converter 4 and the main supply 2 of current to the stator windings 1 is cut off by switch 30.

The acceleration of the motor when being run as an induction motor and the switching over from the auxiliary supply 27 to the main supply 2 is controlled by a synchronising device 31. This synchronising device 31 consists of a small selsyn 32 whose stator 33 is connected to the supply of auxiliary current from the generator 27 and whose rotor 34 is connected to secondary windings 35 of a transformer 36, the primary windings 37 of which are connected in series with the sliprings 3 of the frequency converter 4. During the start up of the motor as an induction motor, the main supply 2 of current is cut off by opening the switches 30 and the current induced in the rotor of the motor is transmitted through the frequency converter 4 and transformer 36 to the rotor 34 of the selsyn 32. The selsyn thus rotates at a speed corresponding to the difference between the frequency of the auxiliary supply being fed to the stator windings and the frequency of the current flowing in the sliprings 3 of the converter 4, which are shorted by the closed switches 29. As the selsyn rotates it drives, through reduction gearing 38, a regulator 39 controlling the speed and hence the output, of the generator 27. It will thus be seen that as the motor accelerates the difference in the two aforementioned frequencies decreases and this is sensed by the selsyn which controls the operation of the auxiliary generator 27. Hence, when the frequencies are the same, the selsyn ceases to rotate so that the current supplied by the generator 27 remains constant.

A contact arm 40 is attached to the shaft of the selsyn 32 and serves to close contacts 41 each time the motor and converter are in the correct phase relationship. The contacts 41 are connected to a relay 42 but this does not have time to pull up and maintain itself closed until the speed error of the rotor of the motor from the predetermined chosen speed of the frequency converter is sufficiently small. When this occurs, the transfer relay 42 closes, thereby causing the switches 28 and 29 to open, thus cutting off the auxiliary generator 27 and opening the short circuit of the sliprings 3 of the converter 4, and closing the switches 30 so that the stator windings 1 of the motor are connected to the main supply 2 of the polyphase A.C. current. The motor is thus caused to run in the manner hereinbefore described.

The slipring motor may be inverted with its rotor fed from the polyphase A.C. supply in which case the stator windings are connected to the brushes on the commutator of the converter and the motor is caused to run and be controlled in the manner hereinbefore described.

What we claim is:

1. A position control servo-system operable from a polyphase A.C. supply and including a polyphase slipring electric motor having stator windings and rotor windings, a polyphase transformer having primary windings connected to said supply and to said stator windings, secondary windings and tertiary windings, an independently driven torqueless frequency converter connected in series between said secondary windings and said rotor windings and connected to said tertiary windings, drive means for said frequency converter, and a choke connected in circuit with said supply and to said tertiary windings whereby an additional current drawn from said supply by said choke is injected through said frequency converter into said rotor windings.

2. A position control servo-system according to claim 1, including phase swing damping resistors connected across the supply of current to the rotor.

3. A position control servo-system operable from a polyphase A.C. supply and including a polyphase slipring electric motor having stator windings and rotor windings, said stator windings being closed to a star point and being connected to said supply, a transformer having a primary winding, through which the stator current is passed, and a secondary winding, an independently driven torqueless frequency converter connected in series between said secondary windings and said rotor windings, drive means for said frequency converter, and a choke connected in circuit with said supply and said frequency converter for drawing an additional current from said supply and injecting said current through said frequency converter into said rotor windings.

4. A position control servo-system according to claim 3, including phase swing damping resistors connected across the supply of current to said rotor windings.

5. A position control servo-system operable from a main polyphase A.C. supply and including a polyphase slipring electric motor having stator windings and rotor windings, a polyphase transformer having primary windings connected to said supply and to said stator windings, secondary windings and tertiary windings, an independently driven torqueless frequency converter connected in series between said secondary windings and said rotor windings and connected to said tertiary windings, drive means for said frequency converter, and a choke connected in circuit with said supply and to said tertiary windings whereby an additional current drawn from said supply by said choke is injected through said frequency converter into said rotor windings, an auxiliary polyphase variable frequency supply, switch means to connect said auxiliary suppy to said stator windings, switch means to short circuit said frequency converter on its input side, whereby the motor may be started up as an induction motor, and means to compare the frequency of the current supplied by the auxiliary supply with the frequency of the current of the main supply on the input side of the frequency converter, which latter current is induced in said rotor windings, said switch means and said comparing means being operable for cutting off the auxiliary supply from said stator windings, switching the main supply of electric current to said windings and unshorting the input side of the frequency converter when the electric motor is in step with said frequency converter.

6. A position control servo-system according to claim 5, including phase swing damping resistors connected across the main supply of current to the rotor windings on the input side of the frequency converter.

7. A position control servo-system operable from a main polyphase A.C. supply and including a polyphase slipring electric motor having stator windings and rotor windings, said stator windings being closed to a star point and being connected to said main supply, a transformer having primary windings through which the stator current is passed, and secondary windings, an independently driven torqueless frequency converter connected in series between said secondary windings and said rotor windings, drive means for said frequency converter, a choke connected in circuit with said main supply and said frequency converter for drawing an additional current from said main supply and injecting said current through said frequency converter into said rotor windings, an auxiliary polyphase variable frequency supply, switch means to connect said auxiliary supply to said stator windings, and to disconnect said main supply from said stator windings, switch means to short circuit the frequency converter on its input side whereby the motor may be started up as an induction motor, and means to compare the frequency of the current of the auxiliary supply with the frequency of the current of the main supply on the input side of the frequency converter, which latter current is induced in said rotor windings, said switch means and said comparing means being operable for actuating said switch means to disconnect the auxiliary supply from the stator windings, connect said stator windings to the main supply, and unshort the input side of the frequency converter when the electric motor is in step with said frequency converter.

8. A position control servo-system according to claim 7, including phase swing damping resistors connected across the supply of current to the rotor windings on the input side of the frequency converter.

9. In combination at least two position control servo-systems according to claim 8 connected to a main polyphase A.C. supply and including a common drive means driving the two frequency converters respectively included in said servo-systems.

10. In combination at least two position control servo-systems according to claim 6 connected to a main polyphase A.C. supply and including a common drive means driving the two frequency converters respectively included in said servo-systems.

11. A position control servo-system operable from a polyphase A.C. supply and including a polyphase slipring motor having a motor stator winding and a motor rotor winding, a polyphase transformer having primary windings connected to said supply and to one of said motor windings, secondary windings and tertiary windings, an independently driven torqueless frequency converter connected in series between said secondary windings and the other of said rotor windings and connected to said tertiary windings, drive means for said frequency converter, and a choke connected in circuit with said supply and to said tertiary windings whereby an additional current drawn from said supply by said choke is injected through said frequency converter into said other of said motor windings.

12. A position control servo-system operable from a polyphase A.C. supply and including a polyphase slipring electric motor having a stator winding and a rotor winding, said stator winding being closed to a star point, means connecting one of said windings to said supply, a transformer having a primary through which is passed current delivered from said supply to said one of said windings, and a secondary, an independently driven torqueless frequency converter connected in series between said secondary and the other of said windings, drive means for said frequency converter, and a choke connected in circuit with said supply and said frequency converter for drawing additional current from said supply and injecting said current through said frequency converter into said other of said windings.

13. In combination, at least two position control servo-systems according to claim 6 connected to a main polyphase A.C. supply and including a common drive means and a variable gear mechanism coupling each of the two frequency converters respectively included in said servo-systems to said common drive means.

14. In combination, at least two position control servo-systems according to claim 8 connected to a main polyphase A.C. supply and including a common drive means and a variable gear mechanism coupling each of the two frequency converters respectively included in said servo-systems to said common drive means.

References Cited in the file of this patent

FOREIGN PATENTS 426,387   France _____ May 2, 1911